Feb. 7, 1950   H. PFENNINGER   2,496,407
INTERNAL-COMBUSTION TURBINE PLANT
Filed Aug. 7, 1945   2 Sheets-Sheet 1

Inventor
Hans Pfenninger,
By Pierce & Scheffler,
Attorney

Patented Feb. 7, 1950

2,496,407

UNITED STATES PATENT OFFICE 2,496,407

INTERNAL-COMBUSTION TURBINE PLANT

Hans Pfenninger, Baden, Switzerland, assignor to Aktiengesellschaft Brown, Boveri & Cie, Baden, Switzerland, a joint-stock company of Switzerland Application August 7, 1945, Serial No. 609,427
In Switzerland August 24, 1944

8 Claims. (Cl. 60—41)

This invention relates to internal combustion turbine plants and more particularly to turbine plants operating on solid fuel.

Solid fuels can be used by first gasifying them in gas producers and then burning the gas in the combustion chamber of the turbine plant. The prior processes have been inefficient as the gas is generated at low pressure and then compressed for introduction into the combustion chamber that is under a pressure of several atmospheres. The gas leaves the producer at a temperature of several hundred degrees centigrade and is cooled down to reduce the power required for the compressor, and this cooling results in a considerable loss of heat.

According to this invention, these inefficient working conditions are avoided by operating the gas producer under approximately the same pressure as that of the combustion chamber of the turbine plant, and the air for operation of the gas producer is supplied at a somewhat higher pressure to overcome the pressure drop within the gas producer.

The known plants of this type bring the whole amount of compressed air to the higher pressure and throttle down the air supplied to the combustion chamber of the gas turbine by an amount equal to the pressure drop in the gas producer. In these plants therefore the preponderant part of the compressed air is throttled down to reduce its pressure, and this results in a considerable loss in power and efficiency.

The invention aims at avoiding these losses in that, as before, the whole amount of air is brought to the higher pressure, but the pressure drop of the operating air for the gas turbine is utilized to advantage. If for instance the plant has a preheater for the main air supply, the fall in pressure in the preheater is made as great as that of the gas producer. If a number of blowers and turbines are connected in series, the air for the gas producer is taken off at those places where the pressure in the air circuit is higher than that at the combustion chamber by the amount of the pressure drop in the gas producer. This condition however is not sufficient to give satisfactory operation under all loads and, as a further requirement for practical operation, the pressure at the tapping place must rise and fall with varying loads in the same sense as the pressure changes at the entrance to the combustion chamber.

Objects of the invention are to provide combustion turbine plants that may be operated efficiently on solid fuels by first gasifying the fuel under pressure adequate for direct delivery to the combustion chamber, and in which the entire volume of air is compressed to a value appropriate for delivery to the gas producers. An object is to provide combustion turbine plants of the type stated in which the energy input represented by the compression of the major portion of the air to a pressure above that of the combustion chamber is recovered, for example by employing the excess pressure to force the air through a heat exchanger in which it absorbs energy. Another object is to provide a turbine plant which includes a plurality of air compressors and an air circuit with portions thereof under different pressures, at least one gas producer for converting solid fuel to a gaseous state, and an air supply connection to the gas producer from a point in the air circuit at which the pressure is higher than and varies with the pressure at the entrance to the combustion chamber.

These and other objects and advantages of the invention will be apparent from the following specification when taken with the accompanying drawings in which.

Figure 1:
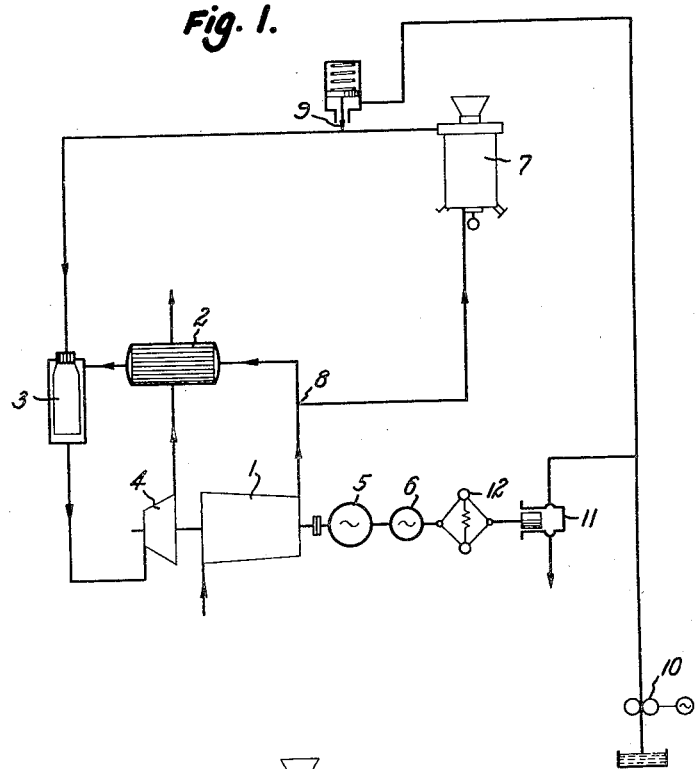
Fig. 1 is a schematic diagram of a single stage combustion turbine plant embodying the invention.

In a single stage internal combustion plant as shown in Fig. 1, the reference numeral 1 identifies a compressor for supplying air through a heat exchanger 2 to the combustion chamber 3 of the turbine 4 that drives the compressor 1 and a generator 5. A motor 6 is provided for starting the turbine plant, the motor shaft being integral with or connected to the generator shaft.

The fuel for operating the turbine plant is coal or other gasifiable substances that are converted to gases in the gas producer 7 that operates under pressure established by connecting the air inlet line of the gas producer to a point 8 in the compressed air circuit at which the pressure is higher than that at the combustion chamber 3 by an amount equal to at least the pressure drop through the gas producer 7. As shown, the tapping point 8 is located between the compressor 1 and the air inlet to the preheater 2, and the pressure within the gas producer 7 therefore rises and falls automatically with the pressure in the main air circuit as determined by the load on the turbine plant.

The regulation of the supply of combustion gas to the combustion chamber 3 is effected by a throttle valve 9 that may be located in the air inlet line to the gas producer 7 or, as shown, in the gas outlet line from the gas producer. The control of the throttle valve 9 is effected by any known or desired regulating system. As shown in Fig. 1, the setting of the regulating valve 9 is controlled by the fluid pressure established at the valve 9 by an oil pump 10, the pressure varying with the adjustment of a bleed valve 11 by a governor 12 on a shaft driven by the turbine 1.

Since the fall in pressure in the gas generator varies with the depth of the charge layer and the formation of slag, the adjustment of throttle valve 9 is such that it is not fully open at normal load. In this way, an increase in the pressure drop in the gas producer 7 can be compensated by opening the throttle valve 9 to maintain the production of gas for combustion at normal value. This normal adjustment of the throttle member gives the further advantage that in plants in which the load rises and falls with the number of revolutions, a load jolt can be absorbed more rapidly since the production of gas for combustion is increased at once by opening the throttle member 9, this action taking place before the change in operating speed results in the delivery of a different volume of combustion air for the gas producer.

It should also be mentioned that apparatus according to the invention has the decided advantage over the known types of regulation that the air supplied to the gas producer can be varied in the simplest way between zero and maximum without detriment to the efficiency of the compressor. The operation point of the compressor is not affected greatly by opening or closing the throttle member 9, since the air not flowing to the gas producer 7 flows through the air preheater 2, and the amount of combustion air delivered to the gas producer is small in comparison with the total amount of air delivered.

As already mentioned, the arrangement gives the advantage that upon change in the rotary speed of the compressor-turbine assembly and pressure change in the combustion chamber connected with the same, the corresponding pressure change is automatically set up in the gas producer 7.

In multistage internal combustion turbine plants with a number of combustion chambers that operate with different pressure, each combustion chamber has its own gas producer that operates under approximately the same pressure as that of the combustion chamber. The air for combustion for the different gas producers is taken from points along the motive fluid circuit at which the pressure at the tapping place and at the combustion chamber varies with the turbine speed in such manner that the fall in pressure necessary for the gas producer is obtained at all loads. The regulation is accomplished by a throttle member in the branch line either before or after the gas producer.

Figure 2:
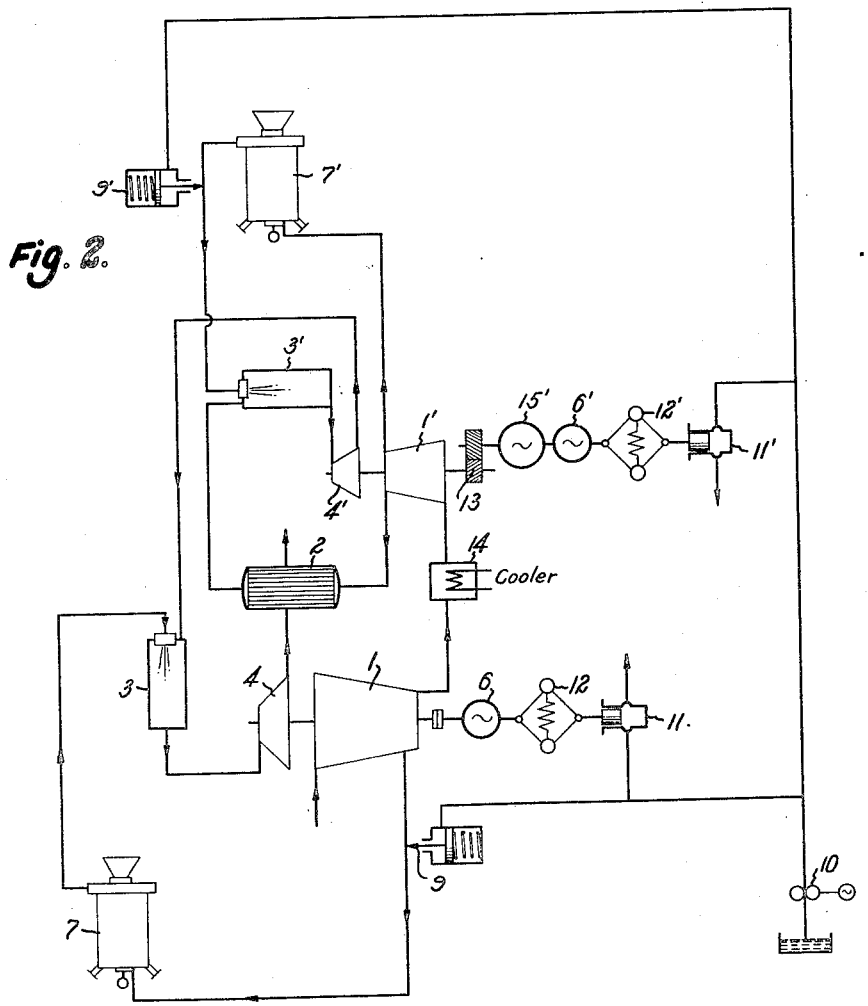
Fig. 2 is a similar schematic diagram of a multiple stage turbine plant.

A two stage turbine plant of this type is shown in Fig. 2, the several elements of the low pressure stage being identified by the same reference numerals as the corresponding elements of the Fig. 1 turbine plant, and the elements of the high pressure stage being identified by primed reference numerals. Each stage includes, in general, the same mechanical assembly as previously described but the entire live load is carried by the high pressure stage, i. e., the low pressure stage does not include the generator 5 of the Fig. 1 plant. The high pressure turbine 4' will usually operate at relatively high speed, with reduction gearing 13 between the turbine-compressor shaft and the common shaft of the generator 15' and starting motor 6'. A part of the compressed air output from compressor 1 passes through a cooler 14 to the compressor 1' of the high pressure stage, and the remainder flows through the gas producer 7 to the combustion chamber 3. The major portion of the high pressure air output of compressor 1' flows through the heat exchanger 2 on its way to the combustion chamber 3'. The other portion of the high pressure air from compressor 1' goes to the gas producer 7' where solid fuel is gasified for delivery to the combustion chamber 3'. The exhaust gases from the turbine 4' are the "combustion air" supply for the combustion chamber 3, and the exhaust gases from turbine 4 are the heating medium of the heat exchanger 2. Throttle valves 9, 9' are provided for regulating the flow of combustion gases to the chambers 3, 3', the valves being regulated by speed governors 12, 12' of the low pressure and high pressure stages respectively. The throttle valves may be controlled directly by the governors or, as shown, may be controlled indirectly by a pressure oil system comprising a pump 10 and bleed valves 11, 11' controlled by the respective speed governors. The particular type of regulating mechanism is not an essential part of this invention and any suitable or desired arrangement may be employed for adjusting the throttle valves 9, 9'. The regulation may be imposed on the air as it flows to the gas producer, as shown by the throttle valve 9, or it may be imposed on the combustion gases at the output side of the gas producer, as shown by the throttle valve 9'.

Figure 3:
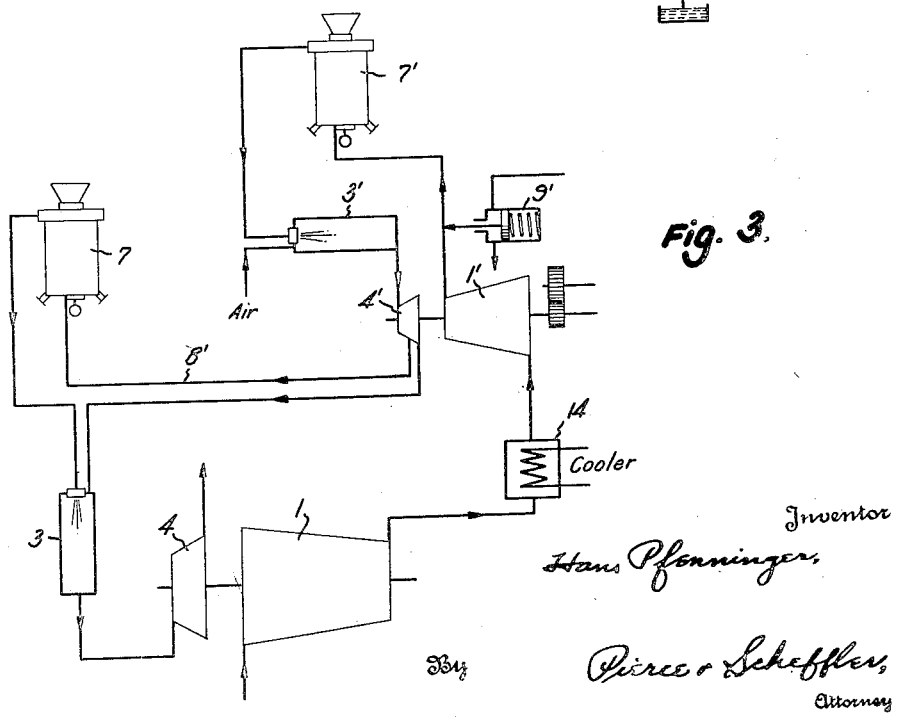
Fig. 3 is a fragmentary schematic diagram of a modified arrangement for a multiple stage combustion turbine plant.

The gas producers can be charged with exhaust gases from the turbines, and this arrangement has the advantage that a lowering of the temperature of combustion is attained in the gas producers by the reduction of carbon dioxide to carbon monoxide. As shown in Fig. 3, a high pressure turbine 4' of a multiple stage assembly may be tapped to deliver exhaust gases to the gas producer 7 of a lower pressure stage through a line 8', the tapping being made at the turbine stage at which the pressure is higher than that of the final exhaust gases, that are delivered to the lower stage combustion chamber 3, by the pressure drop through the gas producer 7.

The place for taking off the air for combustion could moreover be chosen so that the relation of the pressure drop to the absolute pressure in the gas produced would not remain constant during a decreasing number of revolutions of the compressor assembly, but would even increase. In this way, when the load becomes smaller, i. e. in the case with the number of revolutions becoming less, a relatively increasing pressure difference is obtained. The excess in pressure drop can then be utilized for progressive relative increasing of the mixture of combustion gas upon a sudden load build-up, this being necessary for rapid acceleration of the compressor group.

In plants where the additional pressure drop in the gas producer working at the highest pressure cannot be attained by suitable tapping of the motive fluid circuit, it is necessary to provide an additional blower stage for the air for combustion for the gas producer. This is done so that on the compressor, one or more additional stages are provided that compress mainly only the air for combustion of the gas producer. If the capacity for regulation is smaller than in the aforementioned arrangements, a sufficient range of regulation can be obtained by suitable construction of the additional stages. For instance, if an axial flow compressor is used, where the production of pressure in the additional fan is small, a blower characteristic can be attained by a small vane angle that permits a throttling of the air for combustion of the gas producer from full load to no-load. As in the earlier arrangements, the air not required by the gas producer is sent directly to the combustion chamber.

It is to be understood that the invention is not limited to the particular arrangements herein shown and described, and that various modifications that may occur to those familiar with the design and construction of combustion turbine plants fall within the scope of my invention as set forth in the following claims.

I claim:

1. In a combustion turbine plant, the combination comprising coupled combustion gas turbine and air compressor units, a combustion chamber, a fuel gas producer, a conduit for combustion gas between said combustion chamber and turbine, a conduit for fuel gas between said gas producer and combustion chamber, means delivering a portion of the air from said compressor to said gas producer at a pressure higher than the operating pressure of said combustion chamber, an energy transfer apparatus such as a heat exchanger or auxiliary turbine, and means delivering the remainder of said air from said compressor to said combustion chamber through said energy transfer apparatus to effect a drop in air pressure therein approximating the drop in pressure in said gas producer.

2. In a combustion turbine plant, the invention as recited in claim 1 wherein said energy-transfer apparatus is a heat exchanger in which the heating medium is the exhaust gas from said turbine.

3. In a combustion turbine plant, the invention as recited in claim 1, in combination with means for regulating the relative quantities of air delivered from said compressor to said combustion chamber through said gas producer and said energy-transfer apparatus.

4. In a combustion turbine plant, the invention as recited in claim 1, in combination with means for regulating the relative quantities of air delivered from said compressor to said combustion chamber through said gas producer and said energy-transfer apparatus, said regulating means comprising a throttle valve in the air delivery means to said gas producer.

5. In a combustion turbine plant, the invention as recited in claim 1, in combination with means for regulating the relative quantities of air delivered from said compressor to said combustion chamber through said gas producer and said energy-transfer apparatus, said regulating means comprising a throttle valve in the fuel gas conduit from said gas producer.

6. In a combustion turbine plant, a plurality of turbine-compressor stages operating under different pressures, a combustion chamber for each stage, a gas producer for each stage for generating fuel gases from solid fuel, means for supplying combustion air to each gas producer under pressure sufficient for a flow of the fuel gases to the combustion chambers of the associated stages, and conduit means for supplying combustion air to the combustion chambers of the several stages, the compressor of a high pressure stage supplying combustion air to the combustion chamber of that stage and to the gas producer of that stage at a pressure in excess of the operating pressure of the associated combustion chamber, the conduit means for supplying combustion air to the combustion chamber of said high pressure stage being independent of the supply of combustion air to the gas producer of that stage and including energy-transfer means developing a pressure drop approximating the pressure drop of the gas producer of that stage whereby fuel gas and combustion air for that stage enter the combustion chamber at approximately equal pressures.

7. In a combustion turbine plant, the invention as recited in claim 6 wherein an exhaust gas connection from the turbine of a high pressure stage supplies combustion air to the combustion chamber of a lower pressure stage.

8. In a combustion turbine plant, the invention as recited in claim 6 wherein said energy-transfer means comprises a heat exchanger having a heating medium inlet connected to the exhaust side of a turbine of a lower pressure stage.

HANS PFENNINGER.

REFERENCES CITED

The following references are of record in the file of this patent:

UNITED STATES PATENTS

| Number | Name | Date |
|---|---|---|
| 2,055,385 | Noack | Sept. 22, 1936 |
| 2,225,310 | Lindhagen et al. | Dec. 17, 1940 |
| 2,225,311 | Lysholm | Dec. 17, 1940 |

FOREIGN PATENTS

| Number | Country | Date |
|---|---|---|
| 492,831 | Great Britain | Sept. 28, 1938 |